United States Patent [19]

Yokotsuka et al.

[11] Patent Number: 4,820,520
[45] Date of Patent: Apr. 11, 1989

[54] ANTISEPTIC AGENT FOR FOOD AND DRINK AND METHOD OF ANTISEPTIC TREATMENT THEREOF

[75] Inventors: Koki Yokotsuka; Tadae Kushida, both of Yamanashi; Yumiko Kanai, Tokyo; Toshihide Aihara, Yamanashi; Mizuo Yajima, Tokyo; Tomoyoshi Nakajima, Urayasu, all of Japan

[73] Assignee: Asama Chemical Co., Ltd., Tokyo, Japan

[21] Appl. No.: 360,724

[22] Filed: Mar. 22, 1982

[30] Foreign Application Priority Data

Mar. 31, 1981 [JP] Japan .................................. 56-46196
Mar. 31, 1981 [JP] Japan .................................. 56-46197

[51] Int. Cl.$^4$ ........................ C08B 37/06; A23L 3/34; A61K 31/715
[52] U.S. Cl. ................................... 424/439; 106/162; 536/2; 435/275; 426/334; 426/335; 426/532
[58] Field of Search ............... 424/180, 439; 426/532, 426/335, 334; 536/2; 435/275

[56] References Cited

U.S. PATENT DOCUMENTS

| | | | |
|---|---|---|---|
| 2,145,016 | 1/1939 | Spalding | 424/180 |
| 2,259,767 | 10/1941 | Myers | 536/2 |
| 4,016,351 | 4/1977 | Eschinasi | 536/2 |
| 4,143,172 | 3/1979 | Mitchell et al. | 426/532 |
| 4,322,523 | 3/1982 | Wagner | 536/2 |

FOREIGN PATENT DOCUMENTS

| | | | |
|---|---|---|---|
| 424338 | 12/1974 | U.S.S.R. | 426/532 |
| 1110739 | 4/1968 | United Kingdom | 424/180 |

OTHER PUBLICATIONS

Whistler et al., "Industrial Gums", pp. 454-455, Academic Press, 1974.
C.A. 95:35718d; 92:93063k; 77:150640m; 75:150381n; 95:5306a; 87:20831w.
C.A. 57:1375c, The Bactericidal Effect of Products of Carbobydrate Pyrollysis.
Kirk Othmer Encyclopedia, vol. 10, p. 9, 1965.
Nauchni Trudove, Vissh. Inst. KhrANITELNA Vkusova, Prom-Plovdiv 8, 175-85 (1961).

Primary Examiner—Ronald W. Griffin
Attorney, Agent, or Firm—Flynn, Thiel, Boutell & Tanis

[57] ABSTRACT

Disclosed is an antiseptic agent for food and drink, which comprises, as an effective ingredient, a pectin decomposition product having a molecular weight of 600 to 5000. This antiseptic agent is very effective for improving the preservability of food and drink. If at least one member selected from the group consisting of ethanol, glycine, sodium acetate, ascorbic acid, sodium ascorbate, glycerin fatty acid esters, sodium chloride and ethylenediaminetetraacetic acid salts is used in combination with this antiseptic agent, its antifungal activity can further be enhanced.

10 Claims, No Drawings

ANTISEPTIC AGENT FOR FOOD AND DRINK AND METHOD OF ANTISEPTIC TREATMENT THEREOF

BACKGROUND OF THE INVENTION

(1) Field of the Invention

The present invention relates to a novel antiseptic agent for improving the preservability of food or drink and a method of the antiseptic treatment thereof.

More particularly, the present invention relates to an antiseptic agent for food and drink which comprises as an effective ingredient a pectin decomposiiton product having a molecular weight of 600 to 5000 and a method for the antiseptic treatment of food and drink which comprises adding this decomposition product to the food and drink.

(2) Description of the Prior Art

Various foods and drinks and perishables for the manufacture thereof are readily vitiated, deteriorated, discolored and caused to stink by microorganisms, resulting in reduction of their commercial values. Recently, even in the field of food and drink, wide area distribution and large quantity selling have been adopted and it has been required that these foods and drinks should be prevented from putrefying and changing their quality caused by microorganisms and they should be safe from the sanitary viewpoint. Therefore, in order to enhance the preservability of food and drink, there have been adopted such means as refrigeration, sterilization and seal packaging and various synthetic preservatives or sterilizers are added to them during the processing steps. However, since these synthetic preservatives or sterilizers have toxic actions to the human body, the amounts of addition of these agents or kinds of food and drink to which they are added are inevitably restricted and generally no satisfactory results can be obtained. Accordingly, development of antiseptic agents having a high safety has been eagerly desired.

SUMMARY OF THE INVENTION

We made researches with a view to developing a safe antiseptic agent from a natural food product which has been eaten for a long time, and as the result we found that a pectin decomposition product has an antiseptic activity and can practically be used as an antiseptic agent for food and drink effectively. We have now completed the present invention based on these findings.

More specifically, it is an object of the present invention to provide an antiseptic agent for food and drink, which comprises as an effective ingredient a pectin decomposition product having a molecular weight of 600 to 5000.

It is another object of the present invention to provide a method of the antiseptic treatment of food and drink, which comprises adding a pectin decomposition product having a molecular weight of 600 to 5000 to food or drink.

DETAILED DESCRIPITON OF THE PREFERRED EMBODIMENTS

It is known that pectin is widely present in fruits such as apples, grapes and citrus fruits and vegetables, and pectin has been used for a long time as the material for making jam or jelly utilizing its property of easily forming a gel. Pectin is a polymeric substance comprising galacturonic acid and several neutral saccharides such as arabinose, galactose, rhamnose and xylose. In pectin, the composition differs to some extent according to the kind of the starting material. For example, the ratio of galacturonic acid in grape pectin is higher than that in lemon pectin, while the arabinose content in the latter is higher than that in the former. However, it has not been completely elucidated how these components are bonded and arranged to construct pectin. Commercially available pectins are roughly divided in high methoxyl pectin and low methoxyl pectin according to the methoxyl group content. In the present invention, all of the known pectins can be used. In short, the term "pectin" used in the present invention includes pectins of all the origins.

We made researches on various antiseptic substances present in natural substances, and found that while any of pectin per se and constituents of pectin, that is, galacturonic acid and neutral sugars has no antiseptic activity. However, to our great surprise, it was found that a pectin decomposition product having a molecular weight of 600 to 5000 has a considerably strong antiseptic activity. This decomposition product should naturally comprise the same constituents as those of pectin, but the order of connection of the constituents in this decomposition product or the chemical structure thereof has not been elucidated completely and the chemical structure of pectin per se has not been clarified sufficiently. When a pectin decomposition product is analyzed by using a Sephadex column, it is seen that fractions having a molecular weight lower than 600 or higher than 5000 have no substantial antiseptic activity but a fraction having a molecular weight of 600 to 5000 has a strong antiseptic activity. Thus, it is confirmed that the molecular weight is very significant.

Any method may be adopted for effecting decomposition of pectin in the present invention. As a typical method, there can be mentioned a method using an acid or alkali and a method using an enzyme. These two typical methods may be adopted in combination. As the acid, there can be used inorganic acids such as hydrochloric acid, sulfuric acid and phosphoric acid, acidic salts of inorganic acids such as acidic phosphates, and organic acids such as citric acid, malic acid, fumaric acid, acetic acid and succinic acid. As the alkali, there can be used caustic soda, caustic potash, sodium carbonate, potassium carbonate and ammonia. As the enzyme, there can be used commercially available pectinases and enzyme mixtures containing pectinases. Pectinases are classified into small groups taxonomically, but any classified pectinase is not a single substance but a mixture of various pectinases, and such mixtures can be used in the present invention. As the commercially aviable pectinase, there can be mentioned Pectinase Tanabe (supplied by Tanabe Seiyaku K.K.), Sclase N (supplied by Sankyo K.K.), Pectinase Toyo (supplied by Toyo Jozo K.K.), Seishin Pectriase (supplied by Seishin Seiyaku K.K.), Pectinase SS and Macerozym S (both supplied by Kinki Yakult K.K.). Since the pectin decomposition product is added to food or drink and a pectin decomposition product having a molecular weight of 600 to 5000 can be obtained enzymatically at a high efficiency, it is preferred that pectin be enzymatically decomposed. Pectin can be decomposed very easily, and the intended decomposition can be accomplished if only an aqueous solution of pectin is reacted with an enzyme, acid or alkali. When pectin is decomposed by an acid or alkali, the decomposition is advanced to an appropriate stage and neutralization is then effected to stop the decomposition reaction, whereby a decomposition product having a molecular weight of 600 to 5000 can be obtained. When pectin is decomposed enzymatically, the decomposition is advanced more mildly than in case of the decomposition using an acid or alkali and the decomposition hardly proceeds to such an extent that pectin is decomposed into respective ingredients. Therefore, it is not particularly necessary to abruptly stop the decomposition reaction.

The decomposition of pectin will now be described in detail with reference to the method using a pectinase. An aqueous solution of pectin having a concentration of 5 to 20% is prepared, and a pectinase is added to the solution in an amount corresponding to 1/50 to 1/500 of the amount of pectin. Reaction is carried out at 30° to 45° C. for about 48 hours. Then, if necessary, filtration under heating, concentration or drying is performed. Since the viscosity is reduced with advance of the decomposition, the degree of advance of the decomposition can be confirmed by measuring the viscosity of the liquid reaction mixture. For example, in case of an aqueous solution of pectin having a concentration of 5%, when the viscosity of the liquid reaction mixture becomes lower than about 5 cps, it can be judged that the decomposition reaction is substantially completed.

Since the liquid reaction mixture in which the decomposition reaction is completed contains precipitating substances more or less, it is preferred that the liquid reaction mixture be filtered after the decomposition reaction. In the case where the decomposition is carried out enzymatically, if the reaction mixture is once heated at about 70° to about 90° C. and then cooled, filtration is facilitated. If an adsorbent is added to the reaction mixture, filtration is further facilitated and substances promoting the growth of microorganisms present in small quantities can be removed while they are adsorbed on the adsorbent, whereby the antiseptic activity of the pectin decomposition product can further be enhanced. As the adsorbent, there can be used ordinary adsorbents such as active carbon, diatomeceous earth, activated clay, kaolin, bentonite, silica gel, talc, starch particle and acidic clay. An amount of the adsorbent depends on a content of the growth-promoting substances, but in the normal way the adsorbent is used in an amount of 1 to 50% based on the decomposition product. The growth-promoting substance is a kind of undesirable impurity. Some pectins will produce much undesirable impurities and eventually the adsorption step is required in this case. But some pectins will not produce any impurities, and the adsorption step is not needed.

The pectin decomposition product may be added to food or drink in any of the liquid, pasty, powdery, flaky and granular forms. From the viewpoint of the cost, it is preferred that the filtrate obtained by adding an adsorbent to the decomposition product and heating, cooling and filtrating the mixture be directly added to food or drink. In this case, other additives are dissolved or suspended in the filtrate for use. However, in view of easiness of handling or mixing with other solid additives, it is preferred that such filtrate be dried and the decomposition product be used in the form of a powder, flake or granule. As the drying method, there may be adopted a spray drying method, a drum drying method, a shell drying method, a vacuum drying method and a freeze-drying method. Furthermore, there may be adopted a method in which the pectin decomposition product is precipitated in a water-miscible organic solvent such as ethanol, acetone or propylene glycol and the precipitate is recovered and dried according to customary procedures. Still further, there may be adopted a method in which the decomposition product is adsorbed on dextrin, cellulose powder or dry protein powder and is then dried and powdered.

The amount of the thus-obtained pectin decomposition product to be added to food or drink differs to some extent according to the kind of the food or drink and the starting material of pectin, but the pectin decomposition product is ordinarily added to food or drink in an amount of 0.05 to 5%, preferably 0.1 to 3%, as solids.

The reason why the antiseptic activity is manifested when pectin is decomposed is still unknown. However, it is believed that a compound having a basic skeleton showing an antiseptic acitivity will be produced by the decomposition and the antiseptic effect will be manifested by this compound. It also is believed that the constituents of pectin will be bonded to portions of this basic skeleton which have no influences on the antiseptic action and the molecular weight of the pectin decomposition product having an antiseptic activity will be changed according to the molecular weight of these bonded constituents.

The antiseptic activity of the pectin decomposition product can remarkably be increased by using at least one member selected from the group consisting of ethanol, glycine, sodium acetate, ascorbic acid, sodium ascorbate, glycerin fatty acid esters, sodium chloride and ethylenediaminetetraacetic acid salts in combination with the pectin decomposition product. This auxiliary ingredient may be added to food or drink together with the pectin decomposition product in the form of a mixture prepared in advance or independently from the pectin decomposition product. By the glycerin fatty acid ester mentioned herein is meant a glycerin ester of a saturated fatty acid having 8 to 12 carbon atoms or an unsaturated fatty acid having 18 carbon atoms, that is, linolic acid or linolenic acid. Amounts of addition of these auxiliary ingredients based on food or drink are 0.3 to 3% of ethanol, 0.2 to 2% of glycine, 0.1 to 1% of sodium acetate, 0.1 to 1% of ascorbic acid, 0.1 to 1% of sodium ascorbate, 0.002 to 0.05% of a glycerin fatty acid ester, 1 to 10% by weight of sodium chloride and 0.05 to 0.2% of an ethylenediaminetetraacetic acid salt. In case of food or drink containing ethanol or sodium chloride in a large amount, for example, wine and refined sake as ethanol-containing drinks and soy source and salted vegetable as the sodium chloride-containing food and drink, the above-mentioned upper limits of the amounts of addition of ethanol and sodium chloride are not critical.

As the food and drink to be treated according to the present invention, there can be mentioned, for example, fruit wines such as grape wine and apple wine, refined sake, fruit juices, lactic acid bacterium beverages, ices, ice creams, frozen foods, fish and meat paste products such as boiled fish paste, scorched fish paste and Vienna sausage, bean curds, noodles, shao-mai, dumplings stuffed with minced pork, fresh cream, cakes such as cream puffs, fresh bean jam, daily dishes such as vegetable salads, salted vegetables, and salted and dried fish products.

Since the antiseptic agent of the present invention is a low toxicity, the antiseptic agent of the present invention may be used as a putrefaction-preventing agent in the process for preparation of nourishing meals or therapeutic meals for patients receiving a medical treatment. For example, an easily absorbable peptide obtained by enzymatically decomposing a protein such as casein is often applied as a liquid food to a patient. Since this liquid food has a very high nutritive value, putrefaction occurs readily during the manufacture of this liquid food. If the antispetic agent of the present invention is used for this liquid food, putrefaction can be prevented completely.

In the antiseptic treatment method of the present invention, the pectin decomposition product is added to food or drink by appropriate means, and the method of addition of the pectin decomposition product is not particularly critical in the present invention. In short, it is suffcient if the antiseptic agent is incorporated into food or drink by some means or other. In the present invention, any of the methods for incorporating the antiseptic agent into food or drink is included in the method of addition of the antiseptic agent. Ordinarily, the antiseptic agent is added during the manufacture of processed food or drink. Moreover, there may be adopted a method in which food is immersed in a solution containing the antiseptic agent for a certain time. Furthermore, there may be adopted the ordinary addition method and this immersion method in combination. As the food suitable for the immersion method, there can be mentioned food products which are not deformed in winter, such as fish and meat paste products, e.g., boiled fish paste and Vienna sausage, noodles such as boiled noodle and raw materials of frozen food products, e.g., lobster, shellfish and fish.

When the antiseptic agent of the present invention is used, the preservability of food and drink can remarkably be improved, and in case of a frozen food product or ice, propagation of microorganisms can be inhibited at the steps before freezing and especially good sanitary effects can be attained.

The present invention will now be described in detail with reference to the following Examples which by no means limit the scope of the invention.

EXAMPLE 1

Grape pectin, apple pectin and lemon pectin (each of the high methoxyl type) were used as the pectin. Seishin Pectriase was used as the pectinase. In 1 l of water was dissolved 50 g of the pectin and 0.3 g of Seishin Pectriase was added to the solution, and reaction was conducted at 37° C. for 20 hours to decompose the pectin. The viscosity of the liquid reaction mixture was measured and the decomposition reaction was stopped when the viscosity became lower than about 2 cps. Then, 20 g of diatomaceous earth was added to the liquid reaction mixture, and the resulting mixture was heated at 80° C., cooled and dried under a reduced pressure to obtain a powdery product. When the thus-obtained decomposition product was analyzed using a Sephadex column (Bio Gel P-2), it was found that the majority of the decomposition product had a molecular weight in the range of from 600 to 5000.

The pectin decomposition product was subjected to the antiseptic activity test using *Escherichia coli* US/41 according to the following procedures.

The pectin decomposition product was added in a concentration shown in Table 1 to a substitute bouillon culture medium (having a pH value of 5.0), and the culture medium was inoculated with *E. coli* and culturing was conducted at 37° C. for 4 days. Then, the turbidity was determined. The more conspicuous was propagation of the microorganism, the higher was the turbidity. If the sample had an antiseptic activity, propagation of the microorganism was inhibited and hence increase of the turbidity was controlled. The measurement of the turbidity was performed by using a Crorona turbidimeter (supplied by Corona Denki K.K.) according to the method of JIS 1010 in which the turbidity of water containing 1 ppm of refined kaolin was expressed as one unit of the turbidity.

The pectin per se or galacturonic acid was used as a control.

The obtained results are shown in Table 1, from which it will readily be understood that pectin per se or galacturonic acid has no antiseptic activity while a pectin decomposition product has a considerably strong antiseptic activity.

TABLE 1

| Sample | Concentration | | |
|---|---|---|---|
| | 0.5% | 1.0% | 2.0% |
| grape pectin (control) | — | — | 389 |
| apple pectin (control) | — | — | 383 |
| lemon pectin (control) | — | — | 425 |
| galacturonic acid (control) | — | — | 370 |
| grape pectin decomposition product (present invention) | 330 | 170 | 2 |
| apple pectin decomposition product (present invention) | 416 | 78 | 2 |
| lemon pectin decomposition product (present invention) | 500 | 44 | 1 |
| not added (control) | 500 | | |

Note
Values indicate the turbidity.

EXAMPLE 2

A pectin decomposition product was prepared under the same conditions as in Example 1 except that grape pectin (the highly methoxyl type) was used as the pectin, Pectinase Tanabe (supplied by Tanabe Seiyaku K.K.) was used as the enzyme and the pactin/enzyme ratio was adjusted to 100/1. The pectin decomposition product was subjected to the antiseptic activity test using *Staphylococcus aureus* 1011, *Bacillus subtilis* 1069 and *Pseudomonas aeruginosa* 1095 according to the method described in Example 1.

The obtained results are shown in Tables 2 through 4, from which it will readily be understood that pectin per se or galacturonic acid has no antiseptic activity while a pectin decomposition product of the present invention has a considerable strong antiseptic activity to each microorganism.

TABLE 2

(strain: Staph. aureus 1011)

| Sample | Concentration | | | |
|---|---|---|---|---|
| | 0.25% | 0.5% | 1.0% | 2.0% |
| grape pectin (control) | — | — | — | 112 |
| galacturonic acid (control) | — | — | — | 88 |
| grape pectin decomposition product (present invention) | 109 | 80 | 53 | 6 |
| not added (control) | 136 | | | |

Note
Values indicate the turbidity.

TABLE 3

(strain: B. subtilis 1069)

| Sample | Concentration | | | |
|---|---|---|---|---|
| | 0.25% | 0.5% | 1.0% | 2.0% |
| grape pectin (control) | — | — | — | 500 |

TABLE 3-continued (strain: *B. subtilis* 1069)

| Sample | Concentration | | | |
|---|---|---|---|---|
| | 0.25% | 0.5% | 1.0% | 2.0% |
| galacturonic acid (control) | — | — | — | 500 |
| grape pectin decomposition product (present invention) | 500 | 195 | 87 | 7 |
| not added (control) | 500 | | | |

Note
Values indicate the turbidity.

TABLE 4

(strain: *Pseud. aeruginosa* 1095)

| Sample | Concentration | | | |
|---|---|---|---|---|
| | 0.25% | 0.5% | 1.0% | 2.0% |
| grape pectin (control) | — | — | — | 500 |
| galacturonic acid (control) | — | — | — | 388 |
| grape pectin decomposition product (present invention) | 500 | 360 | 114 | 3 |
| not added (control) | 500 | | | |

Note
Values indicate the turbidity.

EXAMPLE 3

In this Example, the relation between the state of decomposition of pectin and the antiseptic activity was examined.

Lemon pectin (the high methoxyl type) was used as the pectin. The pectin was decomposed under the same conditions as described in Example 1 except that Sclase N (supplied by Sankyo K.K.) was used as the enzyme. While the pectin was decomposed, part of the liquid reaction mixture was sampled at a predetermined interval, and the viscosity was measured and the antiseptic activity test was carried out. In the antiseptic test, culturing was conducted at 37° C. for 1 day at a pectin decomposition product concentration of 1.0%, while other conditions were the same as in Example 1. The antiseptic activity was evaluated by the turbidity of the culture medium determined according to the method described in Example 1. The obtained results are shown in Table 5, from which it will readily be understood that, with advance of the decomposition, the antiseptic activity increases.

TABLE 5

| Decomposition Time (hours) | Viscosity (cps) | Turbidity |
|---|---|---|
| 0 | 3500 | 389 |
| 5 | 380 | 50 |
| 10 | 70 | 7 |
| 15 | 1.65 | 5 |
| 20 | 1.46 | 2 |
| 24 | 1.44 | 2 |

EXAMPLE 4

Lemon pectin was used as the pectin and Seishin Pectriase (supplied by Seishin Seiyaku K.K.) was used as the pectinase. In 10 l of water was dissolved 3 g of the pectinase, and 500 g of the pectin was added to the solution. Reaction was carried out with stirring at 37° C. for 24 hours to decompose the pectin. The state of the decomposition was confirmed by the viscosity of the liquid reaction mixture. When the reaction was conducted for 24 hours, it was found that the viscosity was lower than 5 cps. Thus, it was confirmed that the reaction was completed. Then 100 g of diatomaceous earth was added to the reaction mixture, and the resulting mixture was heated at 90° C., filtered and subjected to the dehydrating drying treatment using an evaporator (at the bath temperature of 50° C.) to obtain a powdery decomposition product. When the thus-obtained pectin decomposition product was analyzed using a Sephadex column (Bio Gel P-2), it was found that the majority of the decomposition product had a molecular weight in the range of from 600 to 5000.

This pectin decomposition product was used in combination with an antiseptic activity-increasing substance (antiseptic activity reinforcer), and its effect on the increase in the antiseptic activity was studied. The antiseptic test was carried out by using a substitute bouillon culture medium (having a pH value of 5.0) and *E. coli* US/41 as the test strain. The antiseptic activity was evaluated based on the turbidity of the culture medium measured according to the method described in Example 1.

The obtained results are shown in Table 6, from which it will readily be understood that the antiseptic activity of a pectin decomposition product of the present invention can remarkably be increased when it is used in combination with the antiseptic activity reinforcer.

Incidentally, values in Table 6 indicate the turbidity.

TABLE 6

| Sample | Storage Period | | | |
|---|---|---|---|---|
| | 1 day | 2 days | 3 days | 4 days |
| not added | 136 | 500 | — | — |
| 2% lemon pectin | 82 | 195 | 362 | 425 |
| 2% galacturonic acid | 49 | 162 | 290 | 370 |
| 0.5% pectin decomposition product | 20 | 203 | 490 | — |
| 0.1% ethanol | 128 | 500 | — | — |
| 1% ethanol | 32 | 492 | — | — |
| 2% ethanol | 0.5 | 344 | 485 | — |
| 0.1% ethanol + 0.5% pectin decomposition product | 7 | 138 | 500 | — |
| 1% ethanol + 0.5% pectin decomposition product | 0 | 17 | 96 | 270 |
| 2% ethanol + 0.5% pectin decomposition product | 0 | 0 | 38 | 82 |
| 0.1% glycine | 130 | 500 | — | — |
| 0.5% glycine | 113 | 481 | — | — |
| 1% glycine | 98 | 420 | — | — |
| 0.1% glycine + 0.5% pectin decomposition product | 15 | 185 | 442 | — |
| 0.5% glycine + 0.5% pectin decomposition product | 32 | 102 | 390 | — |
| 1% glycine + 0.5% pectin decomposition product | 0 | 52 | 273 | 436 |
| 0.05% sodium acetate | 141 | 500 | — | — |
| 0.2% sodium acetate | 38 | 332 | 500 | — |
| 0.5% sodium acetate | 0 | 63 | 250 | 500 |
| 0.05% sodium acetate + 0.5% pectin decomposition product | 22 | 152 | 498 | — |
| 0.2% sodium acetate + 0.5% pectin decomposition product | 0 | 21 | 88 | 194 |
| 0.5% sodium acetate + 0.5% pectin decomposition product | 0 | 0 | 0 | 0 |
| 0.05% sodium ascorbate | 127 | 500 | — | — |
| 0.2% sodium ascorbate | 73 | 381 | — | — |
| 0.5% sodium ascorbate | 6 | 245 | 470 | — |
| 0.05% sodium ascorbate + 0.5% pectin decomposition product | 21 | 254 | 484 | — |
| 0.2% sodium ascorbate + 0.5% pectin decomposition product | 3 | 104 | 397 | — |
| 0.5% sodium ascorbate + 0.5% pectin decomposition product | 0 | 0 | 32 | 95 |
| 0.002% glycerin $C_8$ fatty acid ester | 135 | 500 | — | — |
| 0.01% glycerin $C_8$ fatty acid ester | 112 | 433 | — | — |

TABLE 6-continued

| Sample | Storage Period | | | |
|---|---|---|---|---|
| | 1 day | 2 days | 3 days | 4 days |
| 0.03% glycerin C$_8$ fatty acid ester | 60 | 235 | 478 | — |
| 0.002% glycerin C$_8$ fatty acid ester + 0.5% pectin decomposition product | 18 | 195 | 460 | — |
| 0.01% glycerin C$_8$ fatty acid ester + 0.5% pectin decomposition product | 8 | 98 | 317 | 500 |
| 0.03% glycerin C$_8$ fatty acid ester + 0.5% pectin decomposition product | 0 | 12 | 65 | 256 |
| 1% sodium chloride | 110 | 500 | — | — |
| 2% sodium chloride | 11 | 396 | — | — |
| 3% sodium chloride | 9 | 268 | 386 | 500 |
| 1% sodium chloride + 0.5% pectin decomposition product | 13 | 93 | 305 | 500 |
| 2% sodium chloride + 0.5% pectin decomposition product | 3 | 64 | 241 | 370 |
| 3% sodium chloride + 0.5% pectin decomposition product | 0 | 37 | 43 | 105 |
| 0.002% Na—EDTA | 130 | 500 | — | — |
| 0.02% Na—EDTA | 92 | 132 | 470 | 500 |
| 0.2% Na—EDTA | 0 | 0 | 19 | 2 |
| 0.002% Na—EDTA + 0.5% pectin decomposition product | 21 | 206 | 500 | — |
| 0.02% Na—EDTA + 0.5% pectin decomposition product | 0 | 0 | 65 | 112 |
| 0.2% Na—EDTA + 0.5% pectin decomposition product | 0 | 0 | 0 | 0 |

EXAMPLE 5

In 3400 ml of water dissolved 3 g of Pectinase SS (supplied by Kinki Yakult K.K.) and 3 g of Macerozym S (supplied by Kinki Yakult K.K.), and 600 g of lemon pectin (the high methoxy group) was added and decomposition reaction was carried out with stirring at 37° C. for 24 hours. Then, 200 g of diatomaceous earth was added to the liquid reaction mixture, and the resulting reaction mixture was heated at 85° C. for 20 minutes, cooled and filtered to obtain a transparent pectin decomposition product. When this decomposition product was analyzed by using a Sephadex column, it was found that the majority of the product had a molecular weight in the range of from 600 to 5000.

EXAMPLE 6

To about 1200 g of the pectin decomposition product obtained in Example 5 was added 2000 g of potato starch, and the mixture was kneaded and dried for 20 hours in an air drier maintained at 45° C. to obtain 2250 g of a dry product. The dry product was pulverized in a pulverizer to obtain a dry powder containing the pectin decomposition product.

EXAMPLE 7

In the preparation of a vegetable salad (the French type) having the following composition, the pectin decomposition product obtained in Example 5 was added alone or in combination with glycine at the mixing step. The formed salad was collected on a tray and was simply packed with a wrap, then, it was stored at 20° C. for a predetermined time, and the appearance was examined and the organoleptic test of the flavor and taste was carried out to evaluate the preservability.

| Composition of Vegetable Salad: | |
|---|---|
| Cabbage (washed and sliced) | 10 parts |
| Spaghetti (boiled and cooled) | 8 parts |
| Carrot (washed, sliced, heated and cooled) | 2.5 parts |
| Cucumber (washed and sliced) | 2.5 parts |
| Onion (washed and sliced) | 2 parts |
| Mayonnaise | 5 parts |
| Sliced ham | 1 part |
| Sugar | 0.4 parts |
| Sodium chloride | 0.3 parts |
| Paper | 0.1 part |

The obtained results are shown in Table 7, from which it will readily be understood that when the pectin decomposition product is added alone or in combination with glycine, the preservability can be enhanced and good flavor and taste can be retained.

TABLE 7

| Sample | Storage Period | | | | |
|---|---|---|---|---|---|
| | 2 days | 3 days | 4 days | 5 days | 6 days |
| not added (control) | — | + | | | |
| 0.5% pectin decomposition product (present invention) | — | — | — | + | |
| 0.8% pectin decomposition product + 0.2% glycine (present invention) | — | — | — | — | + |

Note
—: no change of appearance or taste
+: deterioration by microorganisms

EXAMPLE 8

Noodles were prepared from a kneaded mixture of 1 kg of wheat flour with 360 g of water and 15 g of sodium chloride according to customary procedures and the noodles were boiled for 20 minutes to obtain fresh noodles. In this process, a sample described below was added to the noodle dough and the storage test was carried out at a temperature of 35° C. and a relative humidity of 85%. The product obtained in Example 5 or 6 was used as the pectin decomposition product.

Sample (A):
The pectin decomposition product was not added (control).

Sample (B):
The pectin decomposition product obtained in Example 5 was added to the noodle dough in an amount of 0.7% (present invention).

Sample (C):
The pectin decomposition product obtained in Example 5 was added to the noodle dough in an amount of 0.5% and, after the kneaded dough was molded and boiled, the boiled noodles were immersed for 10 seconds in an aqueous solution containing 2% of the pectin decomposition product obtained in Example 5 (present invention).

Sample (D):
The pectin decomposition product powder obtained in Example 6 and sodium acetate were added to the dough at the kneading step in amounts of 0.7% and 0.3%, respectively (present invention).

The obtained results are shown in Table 8, from which it will readily be understood that an improved preservability can be obtained according to the present invention [samples (B), (C) and (D)].

TABLE 8

| Sample | Storage Period | | | | |
| --- | --- | --- | --- | --- | --- |
| | 1 day | 2 days | 3 days | 4 days | 5 days |
| (A) | − | + | | | |
| (B) | − | − | − | + | |
| (C) | − | − | − | − | + |
| (D) | − | − | − | − | + |

Note
−: no change
+: generation of microorganisms observed

EXAMPLE 9

Vienna sausage was prepared from 2 kg of minced pork, 50 g of sodium chloride, 40 g of sugar and 10 of a seasoning according to customary procedures. Then, the sausage was treated according to the method described below, and the sample was subjected to the storage test at 25° C. The product obtained in Example 5 was used as the pectin decomposition product.

Sample (A):
The pectin decomposition product was not added (control).

Sample (B):
The pectin decomposition product was added in an amount of 1.0% (present invention).

Sample (C):
After boiling, the sausage was immersed for 1 minute in an aqueous solution containing 2.0% of the pectin decomposition product (maintained at 80° C.) and was then pulled up (present invention).

Sample (D):
The pectin decomposition product and sodium ascorbate were added in amounts of 0.5% and 0.1%, respectively, and, after boiling, the sausage was immersed for 1 minute in an aqueous solution containing 2.0% of the pectin decomposition product (maintained at 80° C.) and then pulled out (present invention).

The obtained results are shown in Table 9, from which it will readily be understood that an excellent effect can be attained according to the present invention.

TABLE 9

| Sample | Storage Period | | | | | | | |
| --- | --- | --- | --- | --- | --- | --- | --- | --- |
| | 2 days | 3 days | 4 days | 5 days | 6 days | 7 days | 8 days | 9 days |
| (A) (control) | − | + | ++ | | | | | |
| (B) (present invention) | − | − | − | − | − | + | + | ++ |
| (C) (present invention) | − | − | − | − | + | ++ | | |
| (D) (present invention) | − | − | − | − | − | − | − | + |

Note
−: no change
+: generation of microorganisms observed
++: emission of large quantity of gas or formation of membrane-forming yeast observed

EXAMPLE 10

To 2 kg of fresh cream was added 20 g of the pectin decomposition product obtained in Example 5, and the mixture was sufficiently stirred to obtain a homogeneous mixture. This mixture and the starting fresh cream were stored at 15° C. and the viable count was determined to evaluate the preservability. The obtained results are shown in Table 10, from which it will readily be understood that an excellent preserving effect can be attained according to the present invention.

TABLE 10

| Sample | Microorganisms | Viable Count after Storing for | | | |
| --- | --- | --- | --- | --- | --- |
| | | 0 day | 1 day | 2 days | 3 days |
| not added (control) | ordinary bacteria | $2 \times 10^2$ | $6 \times 10^4$ | $2 \times 10^6$ | $>10^9$ |
| not added (control) | colon bacilli | $3 \times 10$ | $4 \times 10^2$ | $7 \times 10^4$ | $2 \times 10^8$ |
| not added (control) | staphylococci | − | $7 \times 10$ | $5 \times 10^3$ | $4 \times 10^7$ |
| pectin decomposition product (present invention) | ordinary bacteria | $2 \times 10^2$ | $2 \times 10^3$ | $1 \times 10^4$ | $9 \times 10^4$ |
| pectin decomposition product (present invention) | colon bacilli | $3 \times 10$ | $8 \times 10$ | $1 \times 10^2$ | $6 \times 10^2$ |
| pectin decomposition product (present invention) | staphylococci | − | − | $3 \times 10$ | $5 \times 10^2$ |

EXAMPLE 11

Fish pastes were prepared from 2 Kg of frozen minced fish meat, 60 g of sodium chloride, 140 g of starch, 100 g of sugar, 20 g of sodium glutamate and 70 g of sweet sake according to customary procedures. At this step, the dry powder of the pectin decomposition product obtained in Example 6 was added in an amount of 1%. The preservability of the resulting fish pastes was tested and compared with that of comparative fish pastes to which the pectin decomposition product dry powder was not added. The storage test was carried out at 30° C. and the growth of mildew or increase of the surface stickiness was checked to evaluate the preservability.

The obtained results are shown in Table 11, from which it will readily be understood that a high preserving effect can be attained according to the present invention.

TABLE 11

| Sample | Storage Period | | | | |
| --- | --- | --- | --- | --- | --- |
| | 2 days | 3 days | 4 days | 5 days | 6 days |
| not added (control) | 0/10 | 7/10 | 10/10 | | |
| pectin decomposition product (present invention) | 0/10 | 0/10 | 1/10 | 5/10 | 10/10 |

Note
numerator: number of pastes in which growth of mildew or increase of the surface stickiness was observed
denominator: number of pastes tested

EXAMPLE 12

Lobsters just before freezing were immersed in an aqueous solution containing 1% of the pectin decomposition product obtained in Example 5 and 0.5% of sodium ascorbate for 1 minute and then they were drained and frozen to form frozen lobsters. Comparative ordinary frozen products were prepared from the same starting material according to the same method except that the immersing treatment was not carried out. The frozen products were allowed to stand still at 20° C. for 5 hours to effect thawing, and the viable count was determined. The obtained results are shown in Table 12, from which it will readily be understood that a high preserving effect can be attained according to the present invention.

TABLE 12

| Sample | Viable Count | | |
|---|---|---|---|
| | ordinary bacteria | colon bacilli | staphylococci |
| ordinary product (control) | $3 \times 10^5$ | $2 \times 10^2$ | $5 \times 10$ |
| product immersed in solution containing pectin decomposition product and sodium ascorbate (present invention) | $5 \times 10^3$ | — | — |

EXAMPLE 13

An easily absorbable peptide obtained by enzymatically decomposing a protein is often applied as liquid food to a patient because this peptide has a high nutritive value. In the process for preparing a powder of this peptide in the state where the peptide contains water, putrefaction often occurs or extreme propagation of microorganisms often occurs even if putrefaction does not occur, with the result that the peptide becomes unsuitable for eating.

In this Example, the preservative effect of the antiseptic agent of the present invention on an aqueous solution containing 5% of this peptide was examined.

Ordinarily, the aqueous solution of the peptide is dried and powdered within 10 hours, and it is necessary that the number of microorganisms propagated during this period should be controlled below $10^3$/ml.

Accordingly, the number of microorganisms in the above aqueous solution was counted at a predetermined interval. The obtained results are shown in Table 13, from which it will readily be understood that if 1% of the pectin decomposition product obtained in Example 5 was added to the aqueous solution containing 5% of the peptide, propagation of microorganisms could be controlled satisfactorily.

TABLE 13

| Sample | Viable Count after Storage at 30° C. for | | |
|---|---|---|---|
| | 0 hours | 5 hours | 10 hours |
| control (not added) | $5 \times 10$ | $8.8 \times 10^4$ | $5.2 \times 10^6$ |
| present invention (1% of pectin decomposition product) | $7 \times 10$ | $1.2 \times 10^2$ | $6.3 \times 10^2$ |

Note
In TABLE 13, values indicate the number of living microorganisms per ml of the aqueous solution.

EXAMPLE 14

7.5 g. of Pectinase SS, available from Kinki Yakult K.K., and 7.5 g. of Macerozym S, available from Kinki Yakult K.K., were dissolved in 8.5 liters of water to obtain a solution. Then 1.5 kg. of lemon pectin of the high methoxyl type, available for making confectionery, was added gradually to the solution, while agitated to get paste. The reaction mixture was allowed to stand at 37° C. for 2 hours, while sometimes agitated, in order to proceed with decomposition reaction. In this way, the viscosity of the mixture was lowered until a stirring machine can operate to the reaction mixture. Then the decomposition reaction was continued at 37° C. for 15 hours while agitated by means of a stirrer of the propeller type. Further 3.75 g. of the above used respective enzymes were added to the reaction mixture and thereafter the decomposition was conducted for 10 hours. After the decomposition had finished, the reaction product was divided into 10 portions each weighing 10 kg. Adsorbents as shown in Table 14 were incorporated into the respective portions of the decomposed liquid each in an amount of 5 wt. %. Each portion was heated to 85° to 90° C. for 20 hours. Then it was cooled to a room temperature and filterated. One of the portions was treated in the same way as above except for no adsorbent was used. Each of the obtained filtrate mixtures was dried under a reduced pressure to get in the form of powder. The obtained powder samples were subjected to the antifungal activity test in the same manner as shown in Example 1. Results are shown in Table 14. It is understood that the portions treated with adsorbents were improved.

TABLE 14

| adsorbent | concentration of pectin-decomposition product | | |
|---|---|---|---|
| | 0.5% | 1.0% | 2.0% |
| active carbon | 230 | 30 | 3 |
| diatomeceous earth | 125 | 15 | 2 |
| activated clay | 201 | 35 | 2 |
| acidic clay | 212 | 32 | 2 |
| kaolin | 205 | 21 | 3 |
| bentonite | 235 | 23 | 2 |
| silica gel | 258 | 38 | 4 |
| talc | 233 | 32 | 4 |
| potato starch | 228 | 35 | 3 |
| no adsorbent | 423 | 57 | 4 |

The embodiments of the invention in which an exclusive property or privilege is claimed are defined as follows:

1. A method for inhibiting growth of microorganisms in an edible food or drink wherein said microorganisms are capable of spoiling said food or drink, which comprises: incorporating in the food or drink, an effective amount of a preservative consisting of a pectin decomposition product obtained by enzymatically decomposing pectin with pectinase until there is formed said pectin decomposition product having a molecular weight in the range of from 600 to 5,000.

2. A method as claimed in claim 1 in which said preservative is mixed with said food or drink.

3. A method as claimed in claim 1 in which a solid food is immersed in an aqueous solution of said preservative.

4. A method as claimed in claim 2 in which from 0.05 to 5 wt.% of said preservative is mixed with said food or drink.

5. A method as claimed in claim 2 in which from 0.1 to 3 wt.% of said preservative is mixed with said food or drink.

6. A method as claimed in claim 1 in which at least one member selected from the group consisting of ethanol, glycine, sodium acetate, ascorbic acid, sodium ascorbate, glycerin fatty acid esters, sodium chloride and ethylenediaminetetraacetic acid salts, is also added to said food or drink in an amount effective, in cooperation with said preservative, to inhibit microbial growth in the food or drink.

7. A method as claimed in claim 1 wherein said preservative is obtained by dissolving pectin in water to form a liquid reaction solution, decomposing said pectin with pectinase to form said preservative and impurities in the reaction solution, and then removing said impurities from the reaction solution by means of a solid adsorbent effective to adsorb said impurities.

8. A method as claimed in claim 7 wherein said adsorbent is selected from the group consisting of active carbon, diatomaceous earth, activated clay, kaolin, bentonite, silica gel, talc, acidic clay and starch.

9. An edible food or drink prepared by the method of claim 4.

10. An edible food or drink according to claim 9, additionally containing mixed therein at least one member selected from the group consisting of
- from 0.3 to 3 wt.% of ethanol,
- from 0.2 to 2 wt.% of glycine,
- from 0.1 to 1 wt.% of sodium acetate,
- from 0.1 to 1 wt.% of ascorbic acid,
- from 0.1 to 1 wt.% of sodium ascorbate,
- from 0.002 to 0.05 wt.% of a fatty acid ester of glycerin wherein the fatty acid is a saturated fatty acid having 8 to 12 carbon atoms or an unsaturated fatty acid having 18 carbon atoms,
- from 1 to 10 wt.% of sodium chloride, and
- from 0.05 to 0.2 wt.% of an ethylenediaminetetraacetic acid salt, all percentages being based on the weight of the food or drink.

* * * * *